(12) United States Patent
Kawaguchi et al.

(10) Patent No.: US 8,553,050 B2
(45) Date of Patent: Oct. 8, 2013

(54) VIDEO SIGNAL PROCESSING APPARATUS, VIDEO SIGNAL PROCESSING METHOD, AND IMAGING DEVICE

(75) Inventors: Zenya Kawaguchi, Tokyo (JP); Yoshihiro Honma, Asaka (JP); Shin Takagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1261 days.

(21) Appl. No.: 11/480,030

(22) Filed: Jun. 30, 2006

(65) Prior Publication Data

US 2007/0019082 A1    Jan. 25, 2007

(30) Foreign Application Priority Data

Jul. 11, 2005  (JP) ................................. 2005-202101

(51) Int. Cl.
    *G09G 5/391*     (2006.01)
(52) U.S. Cl.
    USPC .......................................... 345/667; 345/698
(58) Field of Classification Search
    CPC .............. G09G 2340/0407; G09G 2340/0414;
                            G09G 2340/0421; G09G 5/005
    USPC .................... 345/660, 667, 698, 3.3
    See application file for complete search history.

(56) References Cited

U.S. PATENT DOCUMENTS

| | | | | |
|---|---|---|---|---|
| 5,777,683 A * | 7/1998 | Park et al. | | 348/458 |
| 6,480,230 B1 * | 11/2002 | Honma | | 348/443 |
| 7,046,257 B2 * | 5/2006 | Ochiai et al. | | 345/617 |
| 7,136,110 B2 * | 11/2006 | Honma et al. | | 348/571 |
| 7,411,613 B2 * | 8/2008 | Honma | | 348/222.1 |
| 2002/0033900 A1 * | 3/2002 | Honma et al. | | 348/581 |
| 2002/0196349 A1 * | 12/2002 | Honma | | 348/222.1 |
| 2003/0210338 A1 * | 11/2003 | Matsuoka et al. | | 348/231.99 |
| 2004/0056880 A1 * | 3/2004 | Matsuoka et al. | | 345/716 |
| 2005/0134737 A1 * | 6/2005 | Honma | | 348/569 |
| 2006/0007236 A1 * | 1/2006 | Takagi et al. | | 345/531 |
| 2006/0139464 A1 * | 6/2006 | Honma | | 348/239 |
| 2006/0256203 A1 * | 11/2006 | Honma | | 348/220.1 |
| 2007/0126891 A1 * | 6/2007 | Honma | | 348/239 |

FOREIGN PATENT DOCUMENTS

| | | |
|---|---|---|
| JP | 11-015461 A | 1/1999 |
| JP | 2002-305752 | 10/2002 |
| JP | 2004-094239 A | 3/2004 |

* cited by examiner

*Primary Examiner* — Jeffery A Brier
(74) *Attorney, Agent, or Firm* — Cowan, Liebowitz & Latman, P.C.

(57) ABSTRACT

Disclosed is a video signal processing apparatus applicable to various LCD panels. This video signal processing apparatus includes a format converting unit which converts first-format image data into second-format image data, a point sequential converting unit which converts the second-format image data into point sequenced data, a resizing unit which resizes the point sequenced data, a line memory which stores the resized point sequenced data, and an output control unit which controls to continuously read out the point sequenced data from the line memory.

9 Claims, 10 Drawing Sheets

IN PHASE 1

IN PHASE 2

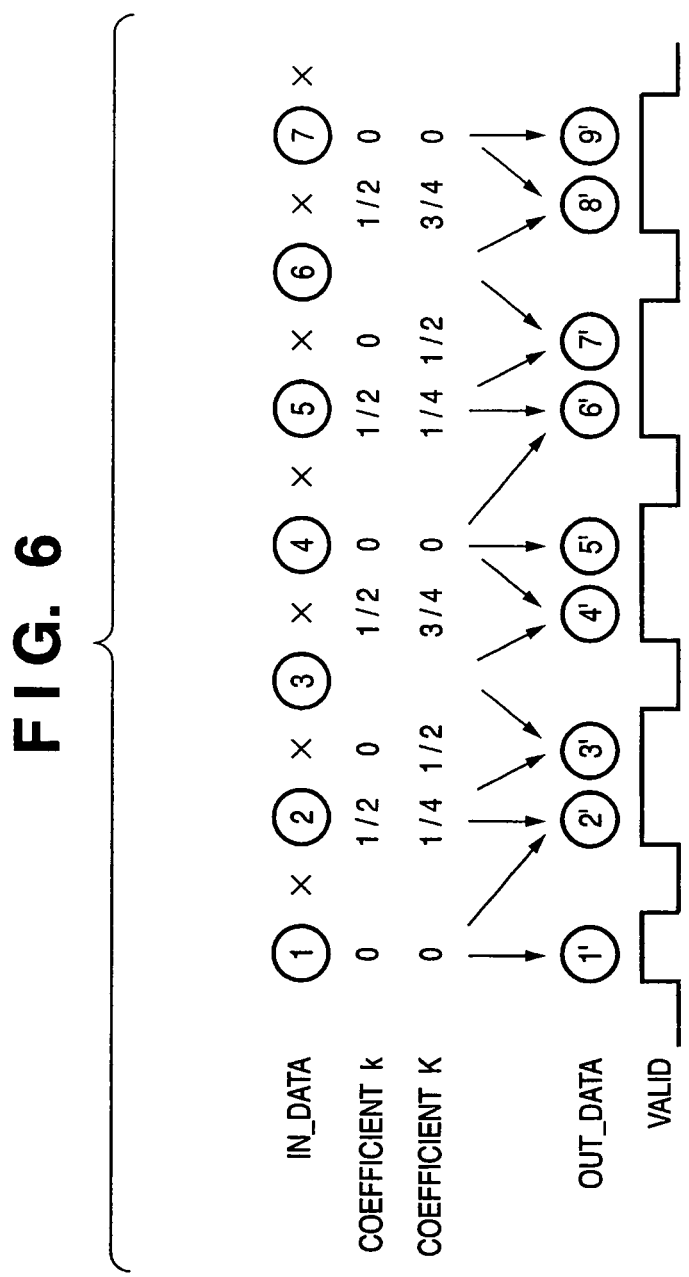

VIDEO SIGNAL PROCESSING APPARATUS, VIDEO SIGNAL PROCESSING METHOD, AND IMAGING DEVICE

FIELD OF THE INVENTION

This invention relates to a video signal processing technique of displaying image data and the like.

BACKGROUND OF THE INVENTION

An imaging device such as a digital camera generally has an LCD panel and can display a photographed image on this LCD panel. Since the size of a photographed image and the number of pixels of the LCD panel are not equal in most cases, a resizing process is necessary.

A device which outputs display data and a pulse skipped clock to an LCD controller is described in Japanese Patent Laid-Open No. 2002-305752. Note that the display data is intermittently formed from resized image data which is formed by resizing image data obtained from an imaging element in accordance with the display size of a TV monitor.

Unfortunately, some general LCD controllers cannot accept the pulse skipped clock and intermittent display data as described above. Accordingly, there are needs for a video signal processing apparatus usable by such LCD controllers.

Therefore, the feature of the present invention is to solve this problem and at least one of several other problems. Note that the other problems will be understood through the whole of this specification.

SUMMARY OF THE INVENTION

A video signal processing apparatus according to the present invention comprises, e.g., a format converting unit, point sequential converting unit, resizing unit, line memory, and output control unit. The format converting unit converts first-format image data into second-format image data. The point sequential converting unit converts the second-format image data into point sequenced data. The resizing unit resizes the point sequenced data. The line memory stores the resized point sequenced data. The output control unit controls to continuously read out the point sequenced data from the line memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing timings when the enlargement ratio is 4/3;

DETAILED DESCRIPTION OF THE PREFERRED EMBODIMENTS

Preferred embodiments of the present invention will now be described in detail in accordance with the accompanying drawings.

First Embodiment

Figure 1:
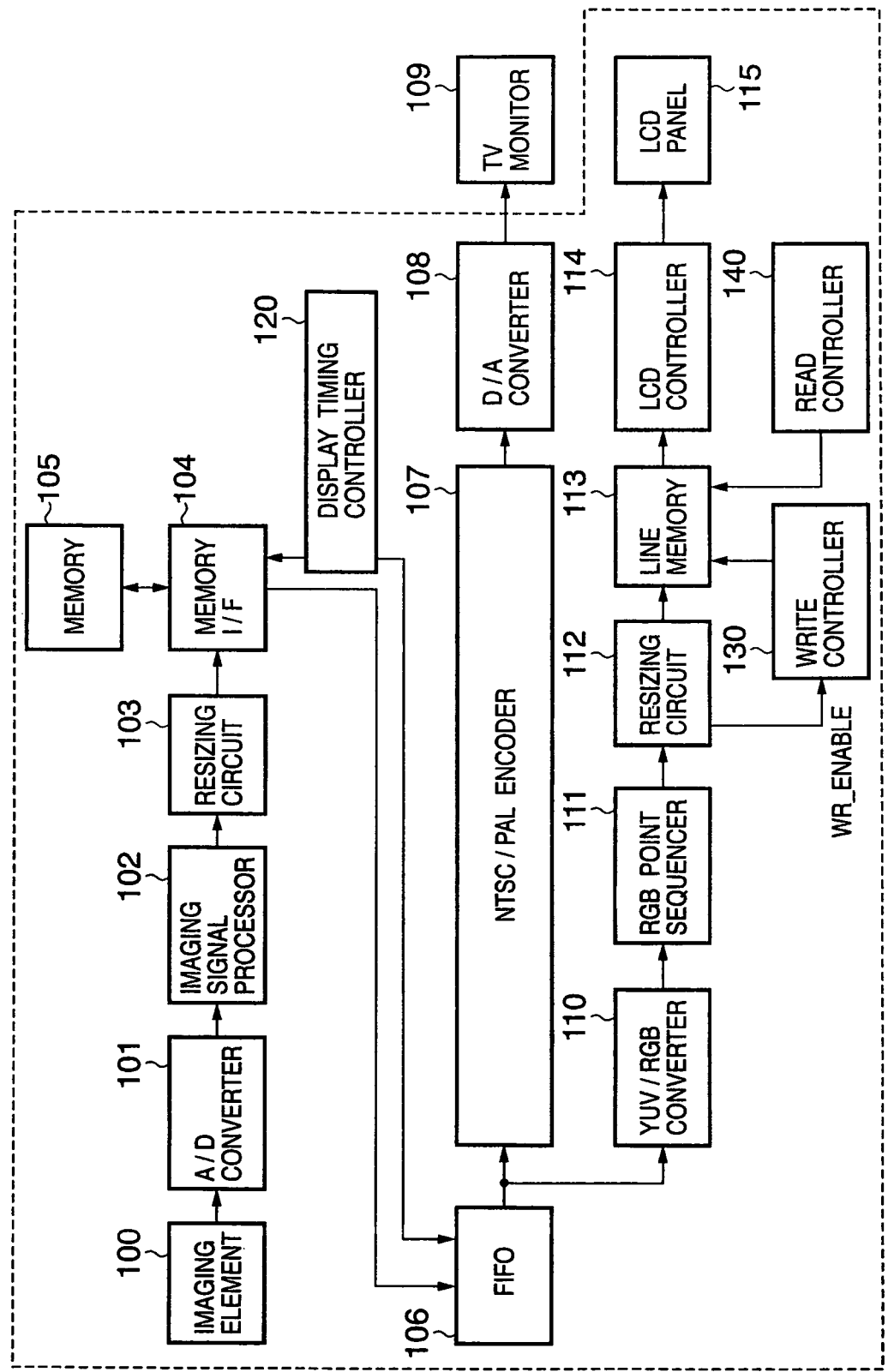
FIG. 1 is a block diagram of an imaging device including a video signal processing apparatus according to an embodiment.

FIG. 1 is a block diagram of an imaging device including a video signal processing apparatus according to the first embodiment. This imaging device is, e.g., a digital camera or digital video camera which incorporates a display device and can be connected to an external TV monitor.

In FIG. 1, reference numeral 100 denotes an imaging element which converts an optical image into an electrical signal; 101, an A/D converter which converts the analog image signal from the imaging element 100 into a digital signal; 102, an imaging signal processor which performs, e.g., gamma processing, interpolation, and matrix transformation on the output data from the A/D converter 101, thereby forming YUV-format image (video) data; 103, a resizing circuit which resizes the image data from the imaging signal processor 102 into the display size of a TV monitor; and 104, a memory I/F which writes and reads out image data and various control data in and from a memory 105.

Reference numeral 106 denotes a buffering FIFO memory which converts the image data read out from the memory I/F 104 into a different data rate; 107, an NTSC/PAL encoder which converts the YUV-format image data read out from the FIFO memory into a composite video signal; 108, a D/A converter; and 109, a TV monitor. Note that as indicated by the dotted-line boundary, the TV monitor 109 need not be mounted on the video signal processing apparatus or imaging device. In this case, the TV monitor 109 is connected to the video signal processing apparatus or imaging device via a video signal terminal or the like.

Reference numeral 110 denotes a YUV/RGB converter which converts the YUV-format image data into an RGB format; 111, a point sequencer which point sequences the output RGB signal from the YUV/RGB converter 110 into RGB. Point sequencing is a concept opposite to plane sequencing. Point sequencing gives importance to pixels forming an image, and sequentially records them from the upper left corner to the lower right corner of the image. For example, a signal is recorded like RGBRGBRGB . . . . Note that plane sequencing records a signal like RRRRRR . . . , GGGGGG . . . , and BBBBB . . . . Reference numeral 112 denotes a linear interpolation resizing circuit which enlarges/reduces the RGB point sequenced signal.

Reference numeral 113 denotes a line memory which stores the resized RGB point sequenced signal; 114, an LCD controller which processes the RGB point sequenced signal continuously output from the line memory 113; and 115, an LCD panel which displays images and the like under the control of the LCD controller 114. Note that it is also possible to use, instead of the LCD panel 115, another type of display device such as a self-emitting display device which can be mounted on the imaging device.

This embodiment will be explained by assuming that the display size of the TV monitor 109 is 720 horizontal pixels×480 vertical lines of the NTSC system, and that the LCD panel 115 has 480 horizontal pixels×240 lines or 960 horizontal pixels×240 lines. In the following explanation, image data stored in the memory 105 is displayed on the TV monitor 109 and LCD panel 115 at the same time.

The output analog image signal from the imaging element 100 is converted into a digital signal (image data) by the A/D converter 101. This image data is input to the imaging signal processor 102. The imaging signal processor 102 performs, e.g., gamma processing, interpolation, and matrix transformation on the input image data, thereby generating YUV-format image data. The resizing circuit 103 enlarges or reduces (i.e., resizes) the formed image data in at least one of the horizontal direction and vertical direction. This resizing forms display image data corresponding to 720 horizontal pixels×480 vertical lines as the display size of the TV monitor 109. After that, the display image data is stored in the memory 105 via the memory I/F 104.

Generally, an NTSC TV monitor performs interlaced display. In the first field, therefore, only 240 odd-numbered lines (a first-field image) of the 480 lines forming the display image are readout from the memory 105 and displayed on the TV monitor 109. In the second field, only 240 even-numbered lines (a second-field image) are read out from the memory 105 and displayed on the TV monitor 109.

On the other hand, the LCD panel 115 performs progressive display. In this embodiment, the number of vertical lines is 240, i.e., half that of the TV monitor 109. Also, in this embodiment, first-field images and second-field images are alternately displayed in synchronism with the TV monitor 109. In this manner, the display image data read out from the memory 105 is displayed on the TV monitor 109 and LCD panel 115 at the same time.

A display timing controller 120 reads out the display image data stored in the memory 105 via the memory I/F 104, and sequentially stores the readout data in the FIFO memory 106. In synchronism with the TV display timing, the display timing controller 120 reads out the image data from the FIFO memory 106, and supplies the readout data to the NTSC/PAL encoder 107 and YUV/RGB converter 110.

The NTSC/PAL encoder 107 generates a composite video signal from the YUV-format image data read out from the FIFO memory 106. The D/A converter 108 converts the composite video signal into an analog video signal. The TV monitor 109 displays an image on the basis of the analog video signal.

On the other hand, the YUV/RGB converter 110 converts the YUV signal into an RGB signal in accordance with the following equations. That is, the equations of conversion from an RGB signal to a YUV signal are $Y=0.299R+0.587G+0.114B$ $U=0.493(B-Y)$ $V=0.877(R-Y)$ Therefore, the inverse conversion is $R=Y+(1/0.877)V=Y+(292/256)V$ $B=Y+(1/0.493)U=Y+(519/256)U$ $G=Y-(0.299/0.587)(292/256)V-(0.114/0.587)(519/256)U$ $=Y-(149V+101U)/256$ When a write enable signal (WR_ENABLE) to the line memory 113 is High, a write controller 130 of the line memory 113 writes a calculation result Z of the linear interpolation resizing circuit 112 into the line memory 113. A read controller 140 continuously reads out data from the line memory 113, and outputs the readout data to the LCD controller 114. That is, the read controller 140 is an example of an output control unit for point sequenced data.

Figure 2:
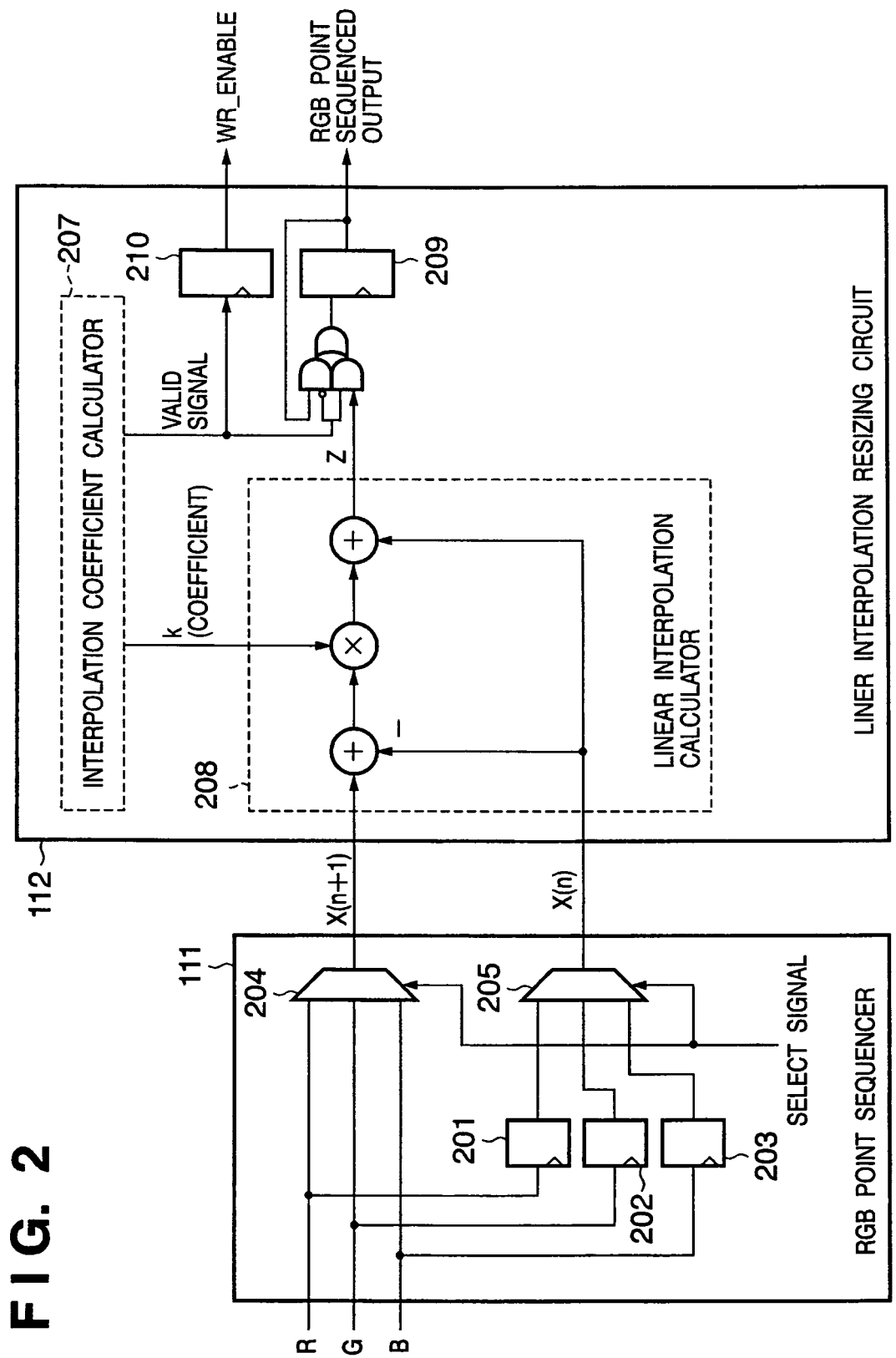
FIG. 2 is a circuit diagram showing details of an RGB point sequencer and linear interpolation resizing circuit according to the embodiment.

FIG. 2 is a circuit diagram showing details of the RGB point sequencer and linear interpolation resizing circuit according to the embodiment. The operations of these circuits will be explained below with reference to FIG. 2. In FIG. 2, reference numerals 201, 202, and 203 denote flip-flops for respectively delaying R, G, and B input data by one cycle; 204, a selector which selects one of the RGB input data; and 205, a selector which selects one of the RGB input data delayed by one cycle. By inputting a select signal to the selectors 204 and 205, input data of two consecutive points having the same color can be output to the linear interpolation resizing circuit 112 on the subsequent stage.

The linear interpolation resizing circuit 112 includes an interpolation coefficient calculator 207, linear interpolation calculator 208, and flip-flops 209 and 210. When the number of horizontal pixels of the LCD panel 115 is smaller than 720 as the number of horizontal pixels of the TV monitor, the linear interpolation resizing circuit 12 performs reduction processing. When the number of horizontal pixels of the LCD panel 115 is larger than 720 as the number of horizontal pixels of the TV monitor, the linear interpolation resizing circuit 12 performs enlargement processing.

(1) Reduction Processing

Figure 3:
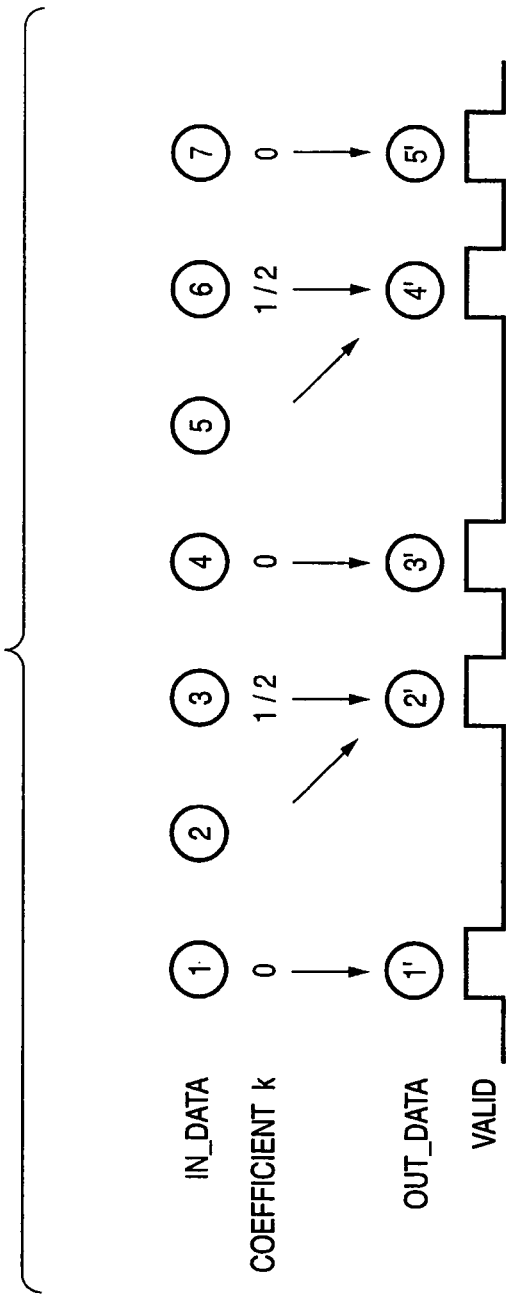
FIG. 3 is a view showing timings when the reduction ratio is ⅔.

FIG. 3 is a view showing timings when the reduction ratio is ⅔. As an example, a case in which the number of horizontal pixels of the LCD panel 115 is 720×⅔=480 will be explained below. It is readily understood from FIG. 3 that two output data (OUT_DATA) are generated from three input data (IN_DATA) by an interpolation coefficient k. Also, the resized image data (OUT_DATA) are continuously output to the line memory 113 in synchronism with a VALID signal. In this way, reduction to ⅔ is achieved.

More specifically, the interpolation coefficient calculator 207 sequentially outputs the interpolation coefficient k to the linear interpolation calculator 208. The interpolation coefficient calculator 207 also sequentially outputs the VALID signal indicating the flag of valid output data to the flip-flop 210 and the like. When the resizing rate is ⅔, for example, the VALID signal changes to High twice in three cycles. The interpolation coefficient k is, e.g., a signal which repeats 0, ½, 0, ½, . . . .

For input data of two consecutive points (the nth data is X(n) and the (n+1)th data is X(n+1) where n is a natural number) input from the RGB point sequencer 111, the linear interpolation calculator 208 calculates a linear interpolation value Z by using the interpolation coefficient k and the following equation.

$$Z=X(n)\times(1-k)+X(n+1)\times k$$

Figure 4:
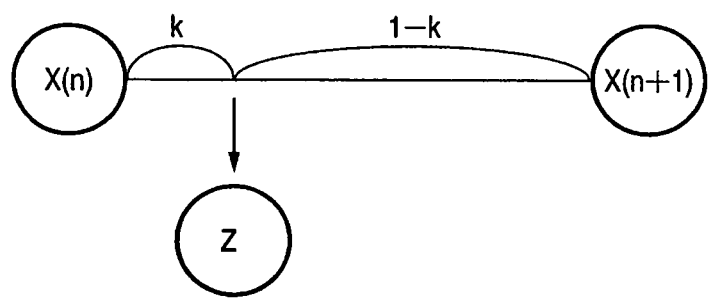
FIG. 4 is a view showing the positional relationship between an linear interpolation value Z output from a linear interpolation calculator according to the embodiment, and X(n) and X(n+1) input from the RGB point sequencer.

FIG. 4 is a view showing the positional relationship between the linear interpolation value Z output from the linear interpolation calculator according to the embodiment, and X(n) and X(n+1) input from the RGB point sequencer. As shown in FIG. 4, the position at which the interval between X(n) and X(n+1) is divided into k:1−k corresponds to Z.

When VALID signal=High, the linear interpolation value Z is input to the flip-flop 209. The linear interpolation value Z is output as RGB point sequenced data. Note that a signal obtained by delaying the VALID signal by one cycle in the flip-flop 210 is the write enable signal (WR_ENABLE) to the line memory (to be described later).

(2) Enlargement Processing

The linear interpolation resizing circuit 112 executes the enlargement processing at a frequency twice the operating frequency range of the reduction processing. This means that the input data undergoes twofold oversampling (enlargement). The linear interpolation resizing circuit 112 executes the reduction processing by using this sampling data. If the desired enlargement ratio is P (1<P<2), the reduction ratio of the interpolation coefficient calculator 207 need only be set at P/2. As a consequence, it is possible to attain an enlargement ratio of 2×P/2=P as a total.

For example, when data is input at a data rate of 13.5 MHz from the RGB point sequencer 111, the linear interpolation resizing circuit 112 operates at 27 MHz as a double frequency. Accordingly, the RGB point sequenced data is reduced after oversampling is performed at a double frequency (i.e., 27 MHz) of the data rate. In this case, an interpolation coefficient K of the linear interpolation calculator 208 is calculated as follows from the interpolation coefficient k output from the interpolation coefficient calculator 207 and the VALID signal indicating the flag of valid output data.

First, assuming that the nth data is X(n) and the (n+1)th data is X(n+1), data represented by $$Y=\{X(n)+X(n+1)\}/2$$

is virtually inserted in the center between the nth and (n+1)th data by twofold oversampling.

The interpolation coefficient calculator 207 operates at the double frequency. Therefore, the timing at which the VALID signal changes to High when the interpolation calculation is performed between X(n) and Y (in the case of phase 1) differs from that when the interpolation calculation is performed between Y and X(n+1) (in the case of phase 2).

When the interpolation calculation is performed between X(n) and Y (in the case of phase 1), the output data Z is $$Z = X(n)\times(1-k) + Y\times k$$
$$= X(n)\times(1-k/2) + X(n+1)\times k/2$$

When the interpolation calculation is performed between Y and X(n+1) (in the case of phase 2), the output data Z is $$Z = Y\times(1-k) + X(n+1)\times k$$
$$= X(n)\times(1-k)/2 + X(n+1)\times(1+k)/2$$

Accordingly, the interpolation coefficient K of the linear interpolation calculator 208 need only be set to $$K=k/2$$

or $$K=(1+k)/2$$

in accordance with the phase in which the VALID signal changes to High.

Figure 5A:
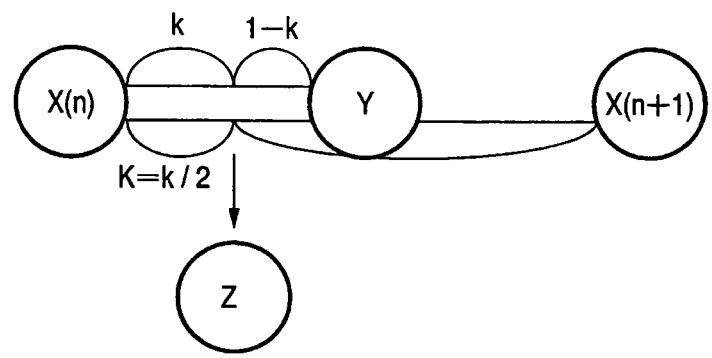
FIGS. 5A and 5B are views showing the positional relationships between X(n), X(n+1), and Z in different phases according to the embodiment.
Figure 5B:
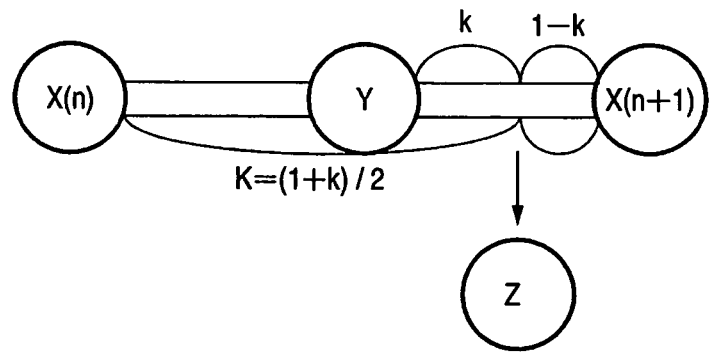

FIGS. 5A and 5B are views showing the positional relationships between X(n), X(n+1), and Z in the different phases according to the embodiment. FIG. 5A shows the positional relationship between X(n), X(n+1), and Z in phase 1. FIG. 5B shows the positional relationship between X(n), X(n+1), and Z in phase 2.

FIG. 6 is a view showing timings when the enlargement ratio is 4/3. In this example, it is assumed that the number of horizontal pixels of the LCD panel 115 is 720×4/3=960. The reduction ratio of the interpolation coefficient calculator 207 is set at 2/3. Also, the interpolation coefficient k repeats 0, ½, 0, ½, . . . , in the same manner as shown in FIG. 3. However, the interpolation coefficient K repeats 0, ¼, ½, and ¾ in accordance with the phase of the VALID signal (FIG. 6).

The linear interpolation calculator 208 calculates the linear interpolation value Z by using the data (X(n) and X(n+1)) of two consecutive points input from the RGB point sequencer 111 and the interpolation coefficient K.

$$Z=X(n)\times(1-K)+X(n+1)\times K$$

When VALID signal=High, the linear interpolation value Z is input to the flip-flop 209, and output as RGB point sequenced data to the line memory 113. A signal obtained by delaying the VALID signal by one cycle in the flip-flop 210 is the write enable signal (WR_ENABLE) to the line memory 113 (to be described later).

When the write enable signal (WR_ENABLE) to the line memory 113 is High, the write controller 130 of the line memory 113 writes the linear interpolation value Z of the linear interpolation resizing circuit 112 into the line memory 113. The read controller 140 continuously reads out data from the line memory 113, and outputs the readout data to the LCD controller 114. Finally, the image is displayed on the LCD panel 115.

In the video signal processing apparatus according to this embodiment, the line memory 113 for storing point sequenced data is placed after the RGB point sequencer 111, so point sequenced data can be continuously output. Accordingly, it is possible to provide a video signal processing apparatus suitably usable in an LCD controller which cannot accept any pulse skipped clock or intermittent display data.

Note that it is of course also possible to provide a video signal processing method which converts first-format image data into second-format image data, converts the second-format image data into point sequenced data, resizes the point sequenced data, stores the resized point sequenced data in the line memory 113, and performs output control by continuously reading out the point sequenced data from the line memory 113.

Also, the capacity of the line memory 113 for storing the point sequenced data can be reduced by placing the line memory 113 after the RGB point sequencer 111. That is, when each of Y, U, V, R, G, and B is, e.g., 8-bit data, a memory capacity of 16 bits per pixel is necessary if the data is stored by the YUV422 format. However, since the RGB point sequenced data is stored, the necessary memory capacity is 8 bits per pixel, i.e., the memory capacity can be reduced to half that when data is stored by the YUV422 format.

In addition, the video signal processing apparatus according to this embodiment includes the NTSC/PAL encoder 107 which generates a composite video signal from YUV-format image data. Therefore, images can be displayed not only on the LCD panel 115 but also on the external TV monitor 109. For example, the LCD panel 115 of an imaging device such as a digital camera is effective to monitor images during photographing, but inconvenient for a large number of people to appreciate images because the display size is small. Accordingly, images of an imaging device are desirably displayed on the TV monitor 109 via a video output terminal or the like.

Furthermore, in this embodiment, the operating frequency range of the linear interpolation resizing circuit 112 is suitably changed in accordance with whether the reduction processing or enlargement processing is performed, and the interpolation coefficient used in the linear interpolation calculator 208 is also suitably determined. This avoids a large increase in circuit scale of the linear interpolation resizing circuit 112.

Second Embodiment

In this embodiment, a technique which reduces the necessary storage capacity of a line memory 113 by delaying the read start timing of the line memory 113 from its write start timing by a time corresponding to the enlargement ratio/reduction ratio will be explained. Note that the explanation will be simplified by denoting the already explained portions by the same reference numerals as above.

(1) Reduction Processing

Figure 7:
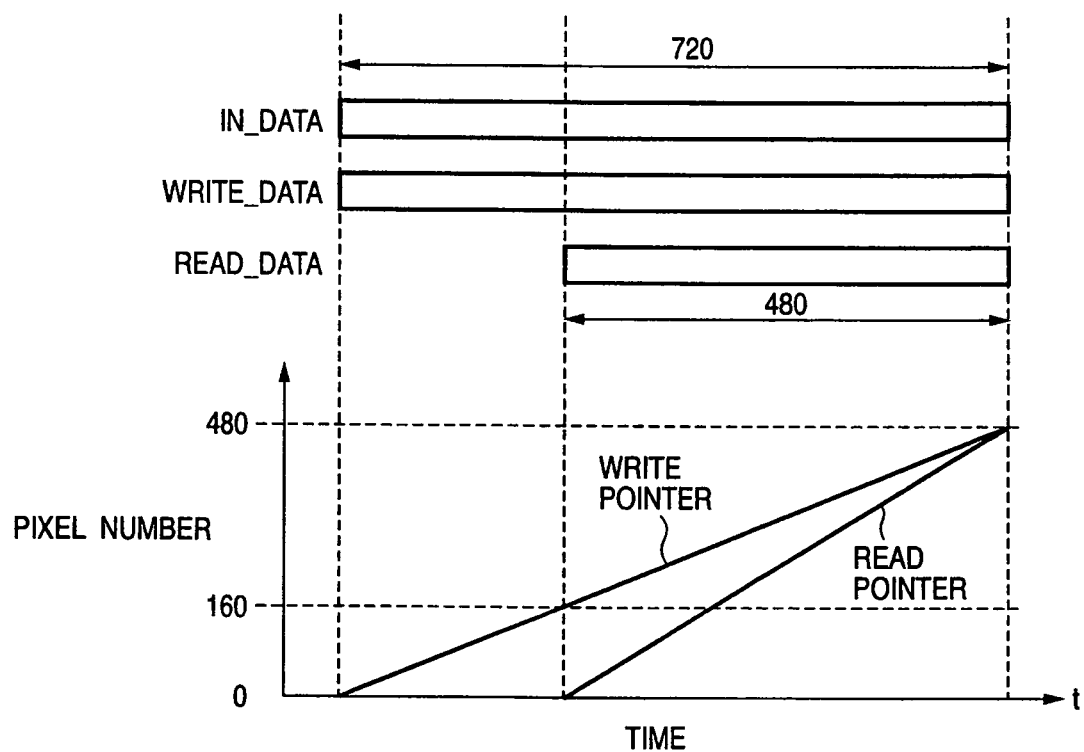
FIG. 7 is a graph showing examples of the timings of a write pointer and read pointer for a line memory.

FIG. 7 is a graph showing examples of the timings of a write pointer and read pointer for the line memory. Referring to FIG. 7, the reduction ratio is ⅔. For example, the number of horizontal pixels of original image data is 720, and the number of horizontal pixels of an LCD panel 115 is 480. The processing shown in FIG. 7 is particularly set such that the read pointer (READ POINTER) points the first data after the write pointer (WRITE POINTER) points the 160th data.

In this embodiment, for example, a read controller 140 starts reading out data from the line memory 113 after the (720−480=240)th data is input to a linear interpolation resizing circuit 112, and the (240×⅔=160)th data is written in the line memory 113. Accordingly, data read can be executed without outpacing the written data. In this case, the line memory 113 need only have a storage capacity capable of storing data of at least 160 pixels.

Generally, the necessary storage capacity of the line memory 113 can be calculated as a function of the number x (x<720) of horizontal pixels of the LCD panel 115.

Since the reduction ratio is x/720, (720−x) data are input to the linear interpolation resizing circuit 112.

If the read controller 140 starts data read after $$(720-x)\times(x/720)$$

data are written in the line memory 113, data read can be performed without outpacing the written data.

Accordingly, the minimum necessary storage capacity of the line memory 113 is $$(720-x)\times(x/720)$$

Figure 8:
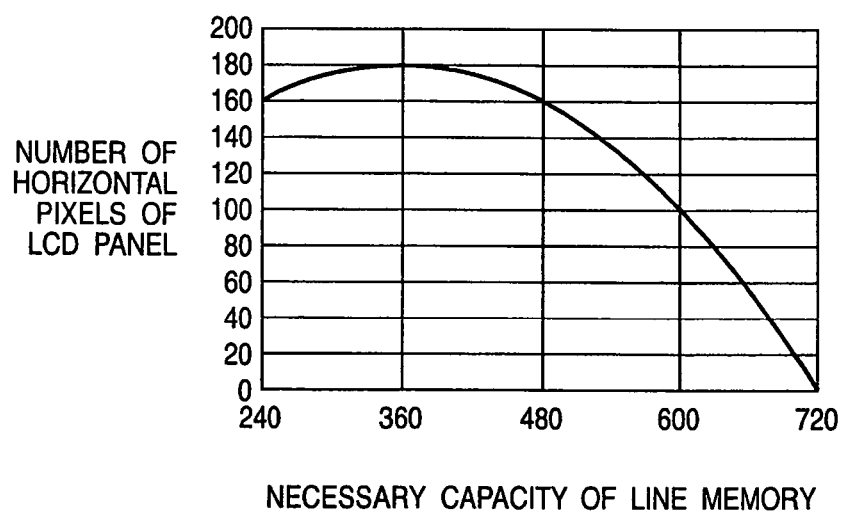
FIG. 8 is a graph showing the relationship between the number of horizontal pixels of an LCD panel and the necessary capacity of the line memory in reduction processing according to the embodiment.

FIG. 8 is a graph showing the relationship between the number of horizontal pixels of the LCD panel and the necessary capacity of the line memory in the reduction processing according to the embodiment. Referring to FIG. 8, the x-axis represents the number of horizontal pixels of the LCD panel 115, and the y-axis represents the necessary capacity of the line memory 113. FIG. 8 shows that if the line memory 113 has a storage capacity of at least 180 data, the video signal processing apparatus according to this embodiment can be applied to an LCD panel having 720 horizontal pixels or less.

(2) Enlargement Processing

Figure 9:
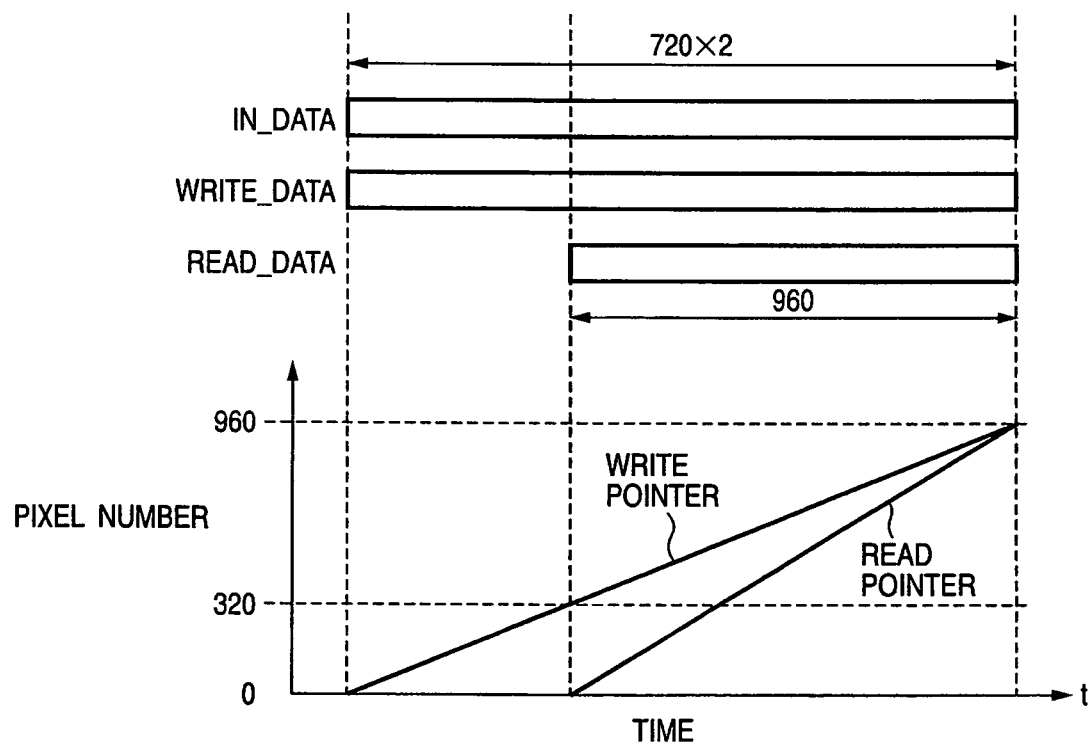
FIG. 9 is a graph showing examples of the timings of the write pointer and read pointer for the line memory when the enlargement ratio is 4/3 (when the number of horizontal pixels of the LCD panel is 960)

FIG. 9 is a view showing examples of the timings of the write pointer and read pointer for the line memory when the enlargement ratio is ⅘ (when the number of horizontal pixels of the LCD panel is 960).

As is apparent from FIG. 9, the read controller 140 preferably starts reading out data after 720×2−960=480 data are input to the linear interpolation resizing circuit 112, and 480×⅔=320 data are written in the line memory 113. In this manner, data can be read out without outpacing the written data. The line memory need only have a capacity of at least 320 data.

The necessary storage capacity of the line memory 113 can be calculated as a function of the number x (720<x<1,440) of horizontal pixels of the LCD panel 115. The enlargement ratio can be represented by (x/720). Accordingly, data read need only be started after (720×2−x) data are input to the linear interpolation resizing circuit 112, and (1,440−x)×(x/1,440) data are written in the line memory 113. That is, data can be read out without outpacing the written data.

As described above, the necessary storage capacity of the line memory 113 is $$(1{,}440-x)\times(x/1{,}440)$$

Figure 10:
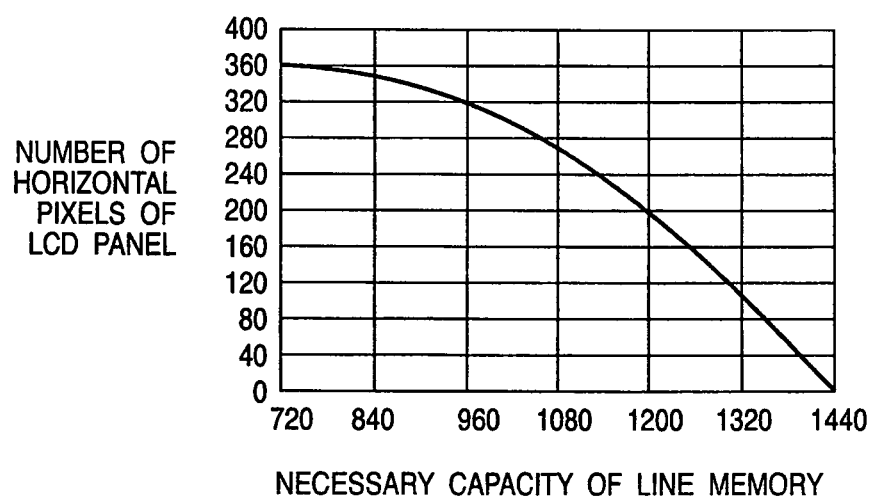
FIG. 10 is a graph showing the relationship between the number of horizontal pixels of the LCD panel and the necessary capacity of the line memory in enlargement processing according to the embodiment.

FIG. 10 is a graph showing the relationship between the number of horizontal pixels of the LCD panel and the necessary capacity of the line memory in the enlargement processing according to the embodiment. The x-axis represents the number of horizontal pixels of the LCD panel. The y-axis represents the necessary capacity of the line memory. It will be understood from FIG. 10 that if the line memory 113 has a storage capacity of at least 360 data, the video signal processing apparatus according to this embodiment can be applied to an LCD panel having 720 to 1,440 horizontal pixels.

In this embodiment as explained above, the necessary storage capacity of the line memory 113 can be reduced by delaying the read start timing of the line memory 113 from its write start timing by a time corresponding to the enlargement ratio/reduction ratio. It is also possible to obtain high display quality with little deterioration in the enlargement processing as well.

Note that in the explanation of each of the above embodiments, the display size of the TV monitor 109 is 720 horizontal pixels×480 vertical lines. Note also that in the above explanation, the number of pixels of the LCD panel 115 is 480 horizontal pixels×240 lines or 960 horizontal pixels×240 lines. However, these practical numerical values are of course mere examples.

For example, the expressions indicated by $$(720-x)\times(x/720)$$

$$(1{,}440-x)\times(x/1{,}440)$$

which represent the storage capacity of the line memory 113 can be generalized into $$(y-x)(x/y)$$

where y indicates the number of horizontal pixels of an original image (the number of horizontal pixels of the TV monitor 109) in the reduction processing, and the number of horizontal pixels of a maximally enlarged image in the enlargement processing. As is apparent from this expression, the storage capacity of the line memory 113 can be made smaller than the half of the data amount of one line of YUV-format data.

Note that in the above embodiments, YUV-format image (video) data and RGB-format image data are explained. However, the present invention is of course also applicable to image data having another format.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-202101, filed Jul. 11, 2005, which is hereby incorporated by reference herein in its entirety.

What is claimed is:

1. An apparatus for processing a video signal, comprising:
a first resizing unit which resizes first-format image data and outputs first-format image data with a first size which corresponds to a display size for TV monitor;
a generating unit which generates a composite video signal with the first size from the first-format image data with the first size;
a format converting unit which converts the first-format image data with the first size into second-format image data with the first size, wherein the second-format image data is RGB data;
a point sequential converting unit which converts the second-format image data with the first size converted by said format converting unit into point sequenced data with the first size;
a second resizing unit which resizes the point sequenced data with the first size converted by said point sequential converting unit and outputs the point sequenced data with a second size which corresponds to a display size for a display panel of the apparatus;
a line memory which stores the resized point sequenced data with the second size output by said second resizing unit; and
an output control unit which controls to continuously read out the point sequenced data with the second size from said line memory,
wherein
said point sequential converting unit outputs data of two consecutive points having the same color from the second-format image data which is RGB data, and
said second resizing unit outputs resized data from the data of the two consecutive points by a linear interpolation calculation.

2. The apparatus according to claim 1, wherein a storage capacity of said line memory is smaller than a half of a data amount of one line related to the point sequenced data with the second size.

3. The apparatus according to claim 1, wherein said output control unit starts reading out data from said line memory with a time delay corresponding to a resizing rate of said second resizing unit from start of write to said line memory.

4. The apparatus according to claim 1, wherein in enlargement processing, said second resizing unit performs reduction processing after oversampling the point sequenced data by N (N is an integer of not less than 2) times.

5. The apparatus according to claim 4, wherein N=2.

6. The apparatus according to claim 5, wherein in the enlargement processing, said second resizing unit operates at a frequency twice a frequency in the reduction processing.

7. The apparatus according to claim 4, wherein said second resizing unit comprises:
a setting unit which sets, in the enlargement processing, a resizing rate whose denominator is determined by an integral multiple of oversampling of an input size, and numerator is determined by an output size; and
a switching unit which switches, before and after a pixel inserted by oversampling, phase calculating methods for an interpolation coefficient to be used in a linear interpolation calculation.

8. The apparatus according to claim 1, further comprising:
an imaging unit which senses an image of an object;
a data generating unit which generates the first-format image data pertaining to the image of the object,
wherein the first resizing unit receives the first-format image data from said data generating unit; and
a display unit which displays on the display panel the point sequenced data with the second size output from said output control unit.

9. A method of processing a video signal, comprising steps of:
resizing first-format image data to output first-format image data with a first size which corresponds to a display size for TV monitor;
generating a composite video signal with the first size from the first-format image data with the first size;
converting the first-format image data with the first size into second-format image data with the first size, wherein the second-format image data is RGB data;
converting the second-format image data with the first size converted in said format converting step into point sequenced data with the first size;
resizing the point sequenced data with the first size converted in said point sequential converting step to output the point sequenced data with a second size which corresponds to a display size for a display panel of the apparatus;
storing the resized point sequenced data with the second size output in said resizing step in a line memory; and
controlling to continuously read out the point sequenced data with the second size from the line memory,
wherein
said step of converting the second-format image data with the first size converted in said format converting step into point sequenced data with the first size comprises outputting data of two consecutive points having the same color from the second-format data which is RGB data, and
said step of resizing the point sequenced data with the first size converted in said point sequential converting step to output the point sequenced data with a second size which corresponds to a display size for the apparatus panel comprises outputting resized data from the data of the two consecutive points by a linear interpolation calculation.

* * * * *